Figure 1:
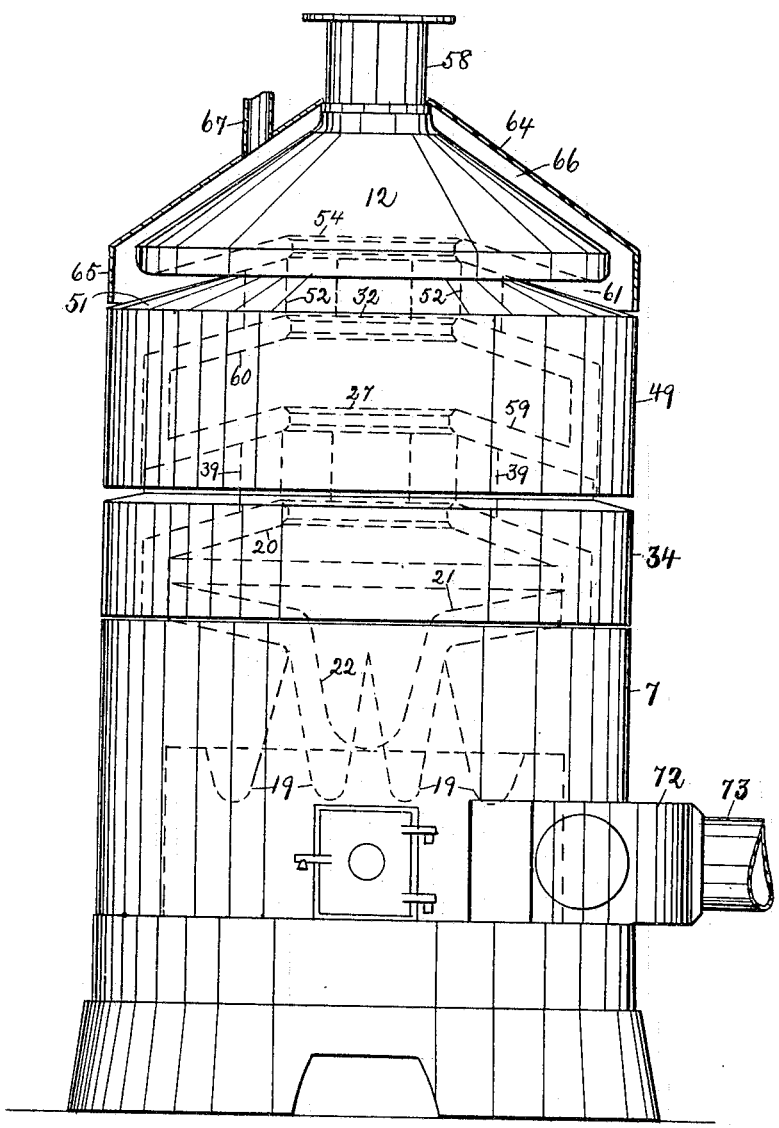

No. 769,470. PATENTED SEPT. 6, 1904.
L. F. DUCKER.
HOT WATER HEATER.
APPLICATION FILED JULY 31, 1903.
NO MODEL. 2 SHEETS—SHEET 1.

Witnesses.
C. H. Garnett
J. Murphy

Inventor.
Louis F. Ducker
by Jas. H. Churchill
atty.

No. 769,470. PATENTED SEPT. 6, 1904.
L. F. DUCKER.
HOT WATER HEATER.
APPLICATION FILED JULY 31, 1903.
NO MODEL. 2 SHEETS—SHEET 2.
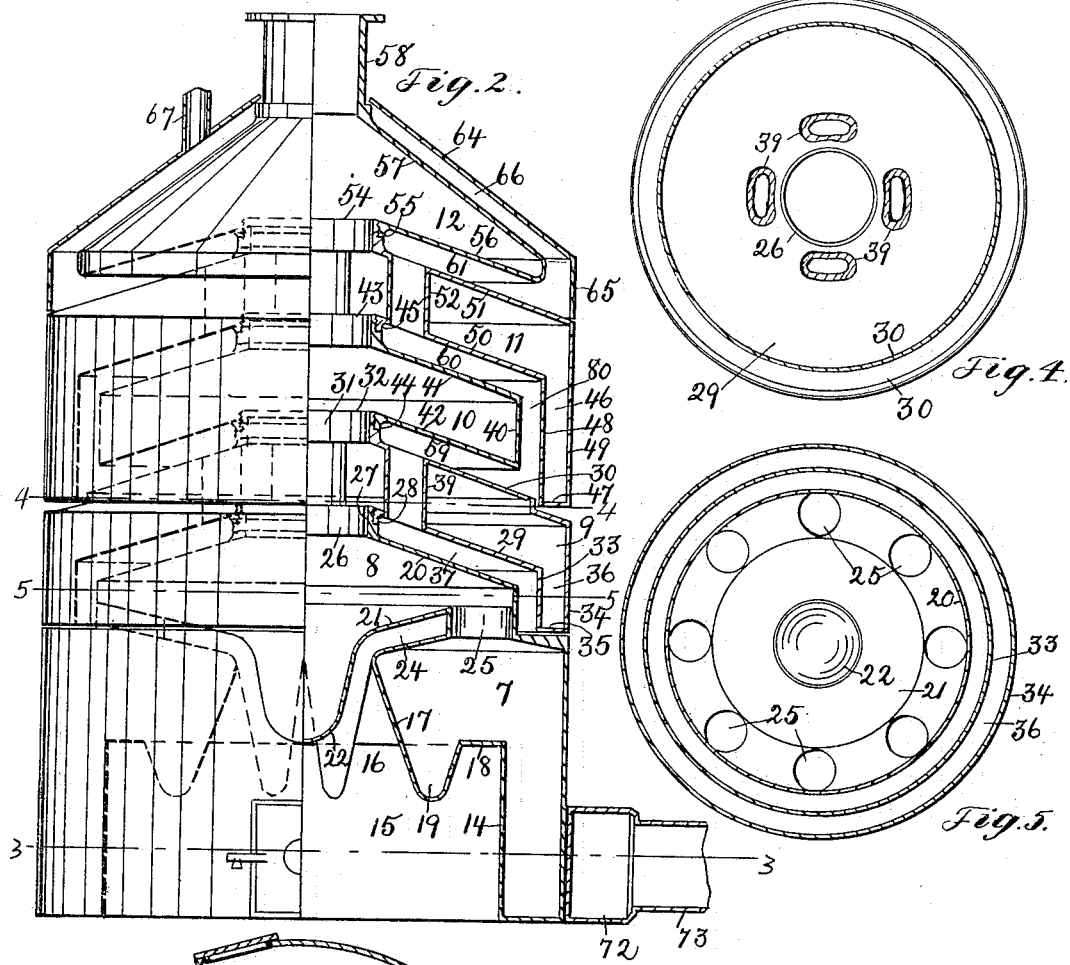
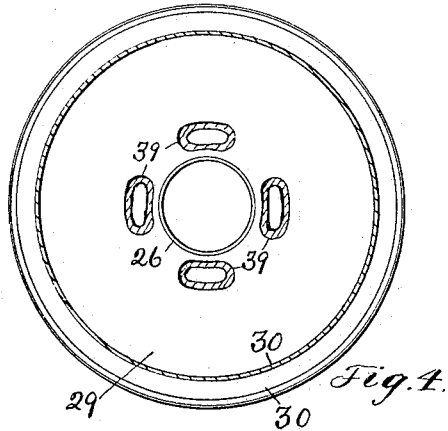
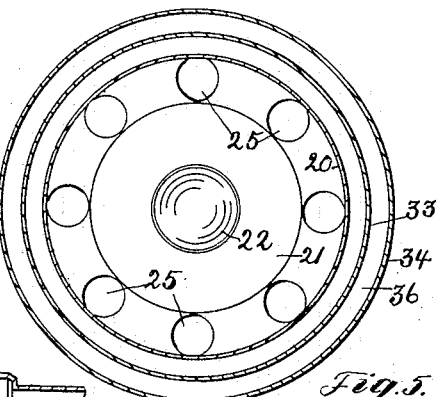
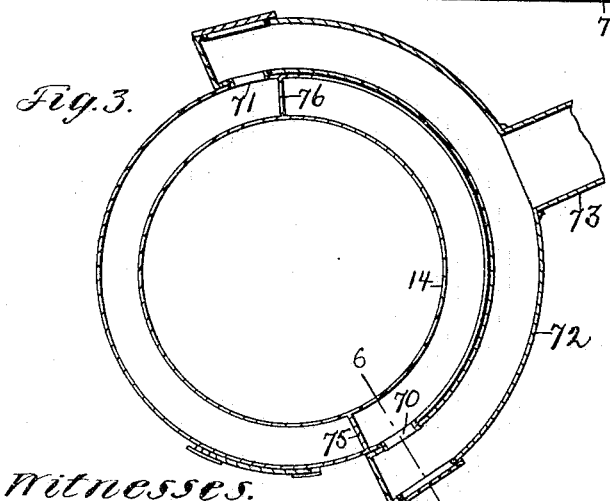
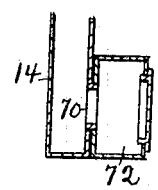
Witnesses.
C. H. Gannett
J. Murphy
Inventor.
Louis F. Ducker
by Jas. H. Churchill
Atty.

No. 769,470. Patented September 6, 1904.

UNITED STATES PATENT OFFICE.

LOUIS F. DUCKER, OF BOSTON, MASSACHUSETTS, ASSIGNOR, BY MESNE ASSIGNMENTS, TO BLUE BLAZES GAS HEATER COMPANY, OF KITTERY, MAINE.

HOT-WATER HEATER.

SPECIFICATION forming part of Letters Patent No. 769,470, dated September 6, 1904.

Application filed July 31, 1903. Serial No. 167,664. (No model.)

*To all whom it may concern:*

Be it known that I, LOUIS F. DUCKER, a citizen of the United States, residing in Boston, in the county of Suffolk and State of Massachusetts, have invented an Improvement in Hot-Water Heaters, of which the following description, in connection with the accompanying drawings, is a specification, like numerals on the drawings representing like parts.

This invention relates to a hot-water heater, and has for its object to provide a simple, inexpensive, and efficient heater for the purpose specified.

In accordance with this invention the heater is composed of a plurality of superimposed sections which are constructed and arranged so as to obtain a maximum heating effect with a minimum expenditure of fuel, as will be described.

Figure 1 is a front elevation of a heater embodying this invention; Fig. 2, a partial vertical section and elevation of the heater shown in Fig. 1; Fig. 3, a cross-section on the line 3 3, Fig. 2; Fig. 4, a cross-section on the line 4 4, Fig. 2; Fig. 5, a cross-section on the line 5 5, Fig. 2; and Fig. 6, a section on the line 6 6, Fig. 3.

The heater herein shown as embodying this invention comprises a plurality of superimposed sections, herein shown as six in number and numbered 7, 8, 9, 10, 11, and 12. The sections referred to are preferably circular in form, and the lowermost section 7 is provided with an annular water-leg 14, which forms, with the upper part of said section, a combustion-chamber or fire-box 15. The section 7 is provided with a substantially central opening 16 for the passage of the products of combustion out of the fire-box, and the side walls 17 of said opening are downwardly inclined and for the best results they are extended below the bottom wall 18 of the section 7 to form a series of depending pockets 19, which are located near the central portion of the firebox, where they are exposed to the highest heat, thereby enabling the water contained in said pockets to be quickly heated. The section 8 of the heater comprises, as herein shown, a conical upper portion or wall 20 and a substantially conical lower portion or wall 21, which extends in the opposite direction to the wall 20 and is provided with a depending substantially central portion 22, extended into the opening 16 and practically forming a deflector for the heat passing out of the fire-box 15. The bottom of the section 8 coöperates with the upper wall of the fire-box section 7 to form a gas-passage 24.

In practice I may prefer to cast the sections 7 8 in one piece, as herein represented, and to provide a plurality of ports or passages 25 for the water from the section 7 into the section 8, and, further, to provide an enlarged substantially central water-outlet passage 26 for the section 8. The water-outlet passage 26 is formed by a nipple or flange 27, which is screw-threaded on its outer circumference to engage a screw-threaded flange 28 on the conical bottom wall 29 of the next adjacent section 9, which is provided with an upper conical wall 30, having a substantially central opening 31, formed by a flange 32. The upper and lower conical walls 29 30 are substantially parallel and are formed integral with substantially vertical side walls 33 34, joined by the bottom wall 35, which forms, with said side walls, a water-leg 36 for the section 9. The water-leg 36 extends substantially close to the upper surface of the section 7, and the lower or inner surface of the section 9 forms, with the upper or outer surface of the section 8, a gas-passage 37, which communicates with the gas-passage 24. The section 9 is provided with preferably a series of pipe-sections 39 extended through it and forming gas-passages.

The section 10 comprises an annular side wall 40 and upwardly-inclined or conical top and bottom walls 41 42, provided with substantially central openings surrounded by flanges 43 44, the flange 44 being screw-threaded to engage the threaded flange 32 of the section 9 and the flange 43 being screw-threaded to engage the flange 45 of the section 11, which later is similar in construction to the section 9 and is provided with the annular water-leg 46, formed by bottom wall 47 and the side walls 48 49, from which extend upwardly the substantially parallel top and bottom walls 50 51, connected by the pipe-sections 52, forming gas-passages, and provided with the substantially central openings surrounded by the flanges 45 54, which are screw-threaded to engage the flange 43 on the section 10 and a flange 55 on the conical bottom wall 56 of the section 12, which is provided with the substantially parallel upper conical wall 57, provided with the flange 58, forming the water-outlet for the heater. The bottom wall of the section 10 forms, with the upper wall of the section 9, a gas-passage 59, which is connected by the pipe-section 39 with the passage 37, and the bottom wall of the section 11 forms, with the upper wall of the section 10, a gas-passage 60, and the bottom wall of section 12 forms, with the upper wall of section 11, a gas-passage 61, which is connected with the passage 60 by the pipe-section 52. The upper section 12 has coöperating with it a conical hood 64, which is provided with an annular flange 65, adapted to rest upon the section 11. This hood forms, with the section 12, a gas-passage 66, provided with an outlet through a pipe 67, attached to said hood, which pipe in practice is connected with the chimney.

The fire-box section 7 may and preferably will be provided with substantially diametrically opposite water-inlet ports 70 71, (see Figs. 3 and 6,) which communicate with a substantially semicircular chamber or pipe 72, connected with the return-pipe 73 of the circulation system. (Not shown.) The water-leg 14 of the section 7 may be provided with vertically-arranged partition-walls 75 76, which are arranged with relation to the inlet-ports 70 71 so that the said ports are cut off from each other within the water-leg, and water admitted into the water-leg through said ports is prevented from circulating completely around the heater, but is dammed up, as it were, and is caused to flow upward on opposite sides of said partition-walls.

By reference to the drawings, and especially Fig. 2, the course of the water may be traced as follows: from the section 7, through the passage 25, into the section 8, thence vertically upward to the outlet 58, the water on its passage to said outlet filling the sections 9, 10, 11, and 12 in succession. The course of the heat is as follows: from the fire-box 15, through the passage 24, into the passage 37, thence through the vertical passage 39 into the passage 59, thence downward through said passage into the vertical passage 80, thence up through the inclined passage 60 into the vertical passage 52, thence downward and outward through the passage 61, thence upward and inward through the passage 66 to the outlet-pipe 67.

It will be observed that the water in the pockets 19 and in the central depression or pocket 22 is subjected to the highest heat, inasmuch as these parts are located near the center of the fire-box and over the hottest part of the fire. It is further to be observed that the depression 22 on the section 8 is substantially in line with the outlet-openings for the sections 9 to 12, inclusive, and consequently an unobstructed path is afforded for the hottest water direct to the circulating system connected with the heater. It is further to be observed that the sections 8, 10, and 12 of smaller diameter are practically enveloped by the heat on its passage from the fire-box to the outlet-pipe 67 and that the walls on both sides of the gas-passages for the greater portion of their length are backed by water, consequently utilizing the heat on its passage through the heater to the greatest advantage. Furthermore, it will be observed that the gases for a part of their course flow upward and inward, then downward and outward, then upward and inward, with the result that the gases remain in contact with the water-containing sections sufficiently long to obtain a maximum heating effect with a minimum consumption of fuel. It will also be noticed that the water which passes into the section 8 from the section 7 is caused to quickly flow by the downwardly-inclined bottom wall to the center of the said section and into the pocket 22, where it is subjected to a maximum heat.

By reference to Fig. 1 it will be seen that the sections of different diameters are arranged so as to form a passage for the gas within a body of water and that the sections of larger diameter serve to cut off the passage of gas directly through the heater and cause it to flow in a reverse direction toward the center of the heater, thereby retarding the gas on its passage through the heater the desired or required amount to obtain a maximum heating effect with a minimum consumption of gas.

In the construction of heater herein shown the vertical water-legs 36 and 46 practically form a vertical shell containing water and with which the larger sections are connected. The vertical shell forms the outer wall of the gas-passage, and the larger sections are extended to said shell, so as to prevent the gas passing directly upward by the sections and through the heater and so as to cause the flow of gas to be reversed and made to pass toward the center of the heater over the upper surface of the smaller sections.

I claim—

1. In a heater of the character described, in combination, a fire-box section provided with a substantially central opening for the passage of the gases of combustion, and a plurality of superimposed sections communicating with one another and with the fire-box section and separated to form a gas-passage, alternate sections of the superimposed sections being of smaller diameter, and the larger of the superimposed sections having water-legs forming part of the walls of said gas-passage, the lowermost of said superimposed sections having a depending portion which extends into the opening in the fire-box section, for the purpose specified.

2. In a heater of the character described, in combination, a fire-box section provided with a substantially central opening for the passage of the gases of combustion and with a plurality of projections forming pockets for the water, and a plurality of superimposed sections communicating with one another and with the fire-box section and separated to form a gas-passage, alternate sections of the superimposed sections being of smaller diameter, and the larger of said superimposed sections having water-legs forming part of the walls of said gas-passage, the lowermost of said superimposed sections having a depending portion which extends into the opening in the fire-box section, substantially as described.

3. In a heater of the character described, in combination, a plurality of superimposed sections of different diameters connected together for the passage of water from one section into another, alternate sections being of substantially the same diameter, and adjacent sections being of different diameters, said sections being separated to form a gas-passage, and the sections of larger diameter having water-legs which form part of the outer wall of said gas-passage, substantially as described.

4. In a heater of the character described, in combination, a fire-box section having a substantially central opening, and a superimposed section provided with a depending portion or depression in its bottom which projects into the opening in said fire-box section, substantially as described.

5. In a heater of the character described, in combination, a plurality of superimposed sections connected together for the passage of water from the lowest to the uppermost section, and separated to form gas-passages between said sections, the lowermost section having a substantially central opening and the next adjacent section having oppositely-inclined top and bottom walls, substantially as described.

6. In a heater of the character described, in combination, a plurality of superimposed sections connected together for the passage of water from the lowest to the highest section and separated to form gas-passages between adjacent sections, water-inlet ports in the lowermost section, vertically-arranged partition-walls in said lowermost section to cut off communication within said section between said inlet-ports, and a water-inlet pipe connected with said inlet-ports, substantially as described.

7. In a heater of the character described, in combination, a plurality of superimposed sections connected together for the passage of water from the lowest to the uppermost section and separated to form gas-passages between said sections, a vertically-arranged gas-passage extended through one of said sections near its center and connecting the gas-passages above and below said section, to cause the gas to pass outward under an upper section, substantially as described.

8. In a heater of the character described, in combination, a plurality of superimposed sections of different diameters connected together for the passage of water from one section into another, and separated to form between them portions of a gas-passage, the sections of larger diameter having water-legs at their outer ends which form with the smaller sections vertical portions of a gas-passage which connect the portions of the gas-passage between said sections, said sections of larger diameter having a gas-passage near their center, substantially as described.

9. In a heater of the character described, in combination, a plurality of superimposed water-containing sections of different diameters connected together for the passage of water from one section into another, a substantially vertical water-containing shell forming the outer wall of substantially vertical sections of a gas-passage, the water-sections of larger diameter extending to said shell to separate the substantially vertical sections of said gas-passage and coöperating with a water-section of smaller diameter to form sections of the gas-passage which extend from the vertical sections of said gas-passage at an angle to said vertical sections, the water-sections of larger diameter having gas-passages through them near the center of the heater to connect the sections of the gas-passage above and below the water-section of larger diameter, substantially as described.

10. In a heater of the class described, in combination, a plurality of superimposed sections connected together for the passage of water from the lowest to the highest section, the lowermost section having a substantially central opening and one or more pockets formed by the wall of said opening, and the next adjacent section having a depression in its bottom in line with the opening in the lowermost section, substantially as described.

11. In a heater of the class described, in combination, a plurality of superimposed sections connected together for the passage of water through said sections, the lowermost section having a substantially central opening, and an upper section having a depression or pocket extended into the said opening, substantially as described.

12. In a heater of the class described, in combination, a plurality of superimposed sections connected together for the passage of water through said sections, the lowermost section having a substantially central opening, and the next adjacent section having an upwardly-inclined upper wall, and a downwardly-inclined lower wall provided with a substantially central depression in line with the opening in the lowermost section, substantially as described.

In testimony whereof I have signed my name to this specification in the presence of two subscribing witnesses.

LOUIS F. DUCKER.

Witnesses:
   JAS. H. CHURCHILL,
   J. MURPHY.